(12) United States Patent
Sambongi

(10) Patent No.: US 8,938,154 B2
(45) Date of Patent: Jan. 20, 2015

(54) MOVING IMAGE CAPTURING APPARATUS, MOVING IMAGE CAPTURING METHOD AND STORAGE MEDIUM STORING MOVING IMAGE CAPTURING PROGRAM, AND DIGEST PLAYBACK SETTING APPARATUS, DIGEST PLAYBACK SETTING METHOD AND STORAGE MEDIUM STORING DIGEST PLAYBACK SETTING PROGRAM

(71) Applicant: Casio Computer Co., Ltd., Tokyo (JP)

(72) Inventor: Masao Sambongi, Hachioji (JP)

(73) Assignee: Casio Computer Co., Ltd., Toyko (JP)

( * ) Notice: Subject to any disclaimer, the term of this patent is extended or adjusted under 35 U.S.C. 154(b) by 25 days.

(21) Appl. No.: 13/846,798

(22) Filed: Mar. 18, 2013

(65) Prior Publication Data

US 2013/0251331 A1  Sep. 26, 2013

(30) Foreign Application Priority Data

Mar. 21, 2012  (JP) ................ 2012-064287

(51) Int. Cl.
*H04N 5/80* (2006.01)
*G11B 27/00* (2006.01)
*H04N 5/93* (2006.01)
(Continued)

(52) U.S. Cl.
CPC .......... *H04N 9/79* (2013.01); *H04N 5/772* (2013.01); *H04N 9/8205* (2013.01); *H04N 21/8549* (2013.01)
USPC ........... 386/242; 386/280; 386/281; 386/284; 386/286; 386/326

(58) Field of Classification Search
USPC .............. 386/280, 281, 284, 286, 326, 242
See application file for complete search history.

(56) References Cited

U.S. PATENT DOCUMENTS 7,391,956 B2   6/2008 Wakimoto et al.
8,218,945 B2 *  7/2012 Hiroi et al. ............... 386/278
(Continued)

FOREIGN PATENT DOCUMENTS

JP  6-165009 A  6/1994
JP  7-143430 A  6/1995
(Continued)

OTHER PUBLICATIONS

Japanese Office Action dated Nov. 12, 2013 (and English translation thereof) in counterpart Japanese Application No. 2012-064287.
(Continued)

*Primary Examiner* — Daquan Zhao
(74) *Attorney, Agent, or Firm* — Holtz, Holtz, Goodman & Chick PC

(57) ABSTRACT

A moving image capturing apparatus includes a capturing section; a sensor; an operation judging section; a priority setting section; a storage section; and a digest playback section. The digest playback setting section includes a portion selecting section; a selected time comparing section; and a setting section. The priority setting section sets a priority for a moving image portion according to a type of state judged by the operation judging section based on a predetermined standard. The digest playback section sets a playback portion of a moving image of a digest playback target. The portion selecting section selects in order from a moving image portion set with a high priority.

9 Claims, 10 Drawing Sheets

(51) Int. Cl.
*H04N 9/79* (2006.01)
*H04N 5/77* (2006.01)
*H04N 9/82* (2006.01)
*H04N 21/8549* (2011.01)
*H04N 5/92* (2006.01)

(56) References Cited

U.S. PATENT DOCUMENTS

| | | |
|---|---|---|
| 8,265,146 B2 | 9/2012 | Nunomaki |
| 2007/0120986 A1* | 5/2007 | Nunomaki ............... 348/222.1 |
| 2008/0117303 A1* | 5/2008 | Furumochi ............... 348/208.2 |

FOREIGN PATENT DOCUMENTS

| | | |
|---|---|---|
| JP | 2006-279320 A | 10/2006 |
| JP | 2007-134770 A | 5/2007 |
| JP | 2007-134771 A | 5/2007 |
| JP | 2009-017598 A | 1/2009 |
| JP | 2011-119934 A | 6/2011 |
| WO | WO 99/03273 A1 | 1/1999 |
| WO | WO 2010/150348 A1 | 12/2010 |

OTHER PUBLICATIONS

Japanese Office Action dated Aug. 27, 2013 (and English translation thereof) in counterpart Japanese Application No. 2012-064287.

* cited by examiner

MOVING IMAGE CAPTURING APPARATUS, MOVING IMAGE CAPTURING METHOD AND STORAGE MEDIUM STORING MOVING IMAGE CAPTURING PROGRAM, AND DIGEST PLAYBACK SETTING APPARATUS, DIGEST PLAYBACK SETTING METHOD AND STORAGE MEDIUM STORING DIGEST PLAYBACK SETTING PROGRAM

BACKGROUND OF THE INVENTION

1. Field of the Invention

The present invention relates to a moving image capturing apparatus, a moving image capturing method and a storage medium storing a moving image capturing program to capture a moving image with which digest playback is possible. The present invention also relates to a digest playback setting apparatus, a digest playback setting method and a storage medium storing a digest playback setting program with which digest playback of a captured moving image is possible.

2. Description of the Related Art

Conventionally, there is a portable moving image capturing apparatus suitable for capturing a moving image while a user moves. In such moving image capturing apparatus, there is an apparatus where it is possible to perform capturing attached to a bicycle or a motorcycle. In such moving image capturing, it is difficult for the user to perform detailed operation of start and end of capturing. Therefore, usually such moving image capturing is performed continuously without limiting the capturing target. However, when such capturing is performed, there is a problem that the user needs to see and confirm the entire imaged data when the captured moving image is played.

Conventionally, as a technique to edit such moving image, there is known a technique in which an event is detected based on input operation on the moving image capturing apparatus by the user or an event is detected based on a relative relation between a position obtained by a GPS device and a position set by input in advance as the capturing position to classify imaged data, and the detected event and the frame position showing the position of the scene in the imaged data are stored corresponded to each other so that the user can easily call the desired scene after capturing to be able to display and to edit the scene (Patent Document 1: WO99/03273). Patent Document 1 further discloses a technique in which the user sets the priority of each frame of the imaged data to thin the imaged data to perform weighting of the selected frame when the imaged data is played.

However, when continuous capturing is performed without limiting the capturing target, it is difficult to set the desired capturing target in advance. Therefore, when the user desires to review the captured moving image within a short amount of time, the user cannot easily select each moving image portion. As a result, there is a problem that the user bears a burden because user operation is necessary.

SUMMARY OF THE INVENTION

The present invention has been made in consideration of the above situation.

According to an aspect of the present invention, there is provided a moving image capturing apparatus including:

a capturing section which captures a moving image;

a sensor which performs measurement to detect a state when moving;

an operation judging section which judges a type of state when moving based on a measured value of the sensor;

a priority setting section which sets a priority for a moving image portion corresponding to a period judged with the type of state in a moving image captured by the capturing section according to the type of state judged by the operation judging section based on a predetermined standard;

a storage section which stores the priority set by the priority setting section corresponded with the moving image portion; and a digest playback setting section which sets a playback portion of a moving image of a digest playback target in which a portion or a whole of the moving image portion is selected, wherein the digest playback setting section includes:

a portion selecting section to select in order from a moving image portion set with a high priority;

a selected time comparing section which compares a total amount of time of a selected moving image portion and a range of digest playback time set in advance each time the moving image portion is selected by the portion selecting section; and a setting section which sets the playback portion of the moving image of the digest playback target, wherein when the selected time comparing section judges that the total amount of time of the selected moving image portion exceeds the range of digest playback time, the moving image portion selected until one time before is set as the playback portion of the moving image of the digest playback target.

According to another aspect of the present invention, there is provided a moving image capturing apparatus including:

a capturing section which captures a moving image;

a sensor which performs measurement to detect a state when moving;

an operation judging section which judges a type of state when moving based on a measured value of the sensor;

a priority setting section which sets a priority for a moving image portion corresponding to a period judged with the type of state in a moving image captured by the capturing section according to the type of state judged by the operation judging section based on a predetermined standard; and a storage section which stores the priority set by the priority setting section corresponded with the moving image portion.

According to another aspect of the present invention, there is provided a digest playback setting apparatus which sets a playback portion for digest playback of moving image data automatically set with a priority for each portion of a string of moving images, the digest playback setting apparatus including:

a portion selecting section to select in order from a moving image portion set with a high priority;

a selected time comparing section which compares a total amount of time of a selected moving image portion and a range of digest playback time set in advance each time the moving image portion is selected by the portion selecting section; and a setting section which sets a playback portion of a moving image of a digest playback target, wherein when the selected time comparing section judges that the total amount of time of the selected moving image portion exceeds the range of digest playback time, the moving image portion selected until one time before is set as the playback portion of the moving image of the digest playback target.

According to another aspect of the present invention, there is provided a moving image capturing method of a moving image capturing apparatus including a capturing section which captures a moving image; and a sensor which performs measurement to detect a state when moving, the moving image capturing method including:

operation judging which judges a type of state when moving based on a measured value of the sensor;

priority setting which sets a priority for a moving image portion corresponding to a period judged with the type of state in a moving image captured by the capturing section according to the type of state judged in the operation judging based on a predetermined standard; and storing which stores the priority set in the priority setting corresponded with the moving image portion.

According to another aspect of the present invention, there is provided a non-transitory computer-readable storage medium having a program stored thereon for controlling a computer used in a moving image capturing apparatus including a capturing section which captures a moving image; and a sensor which performs measurement to detect a state when moving, wherein the program controls the computer to function as:

an operation judging section which judges a type of state when moving based on a measured value of the sensor;

a priority setting section which sets a priority for a moving image portion corresponding to a period judged with the type of state in a moving image captured by the capturing section according to the type of state judged by the operation judging section based on a predetermined standard; and a storage section which stores the priority set by the priority setting section corresponded with the moving image portion.

According to another aspect of the present invention, there is provided a digest playback setting method which sets a playback portion for digest playback of moving image data automatically set with a priority for each portion of a string of moving images, the digest playback setting method including:

portion selecting to select in order from a moving image portion set with a high priority;

selected time comparing which compares a total amount of time of a selected moving image portion and a range of digest playback time set in advance each time the moving image portion is selected in the portion selecting; and setting which sets a playback portion of a moving image of a digest playback target, wherein when it is judged in the selected time comparing that the total amount of time of the selected moving image portion exceeds the range of digest playback time, the moving image portion selected until one time before is set as the playback portion of the moving image of the digest playback target.

According to another aspect of the present invention, there is provided a non-transitory computer-readable storage medium having a program stored thereon for controlling a computer to function as a digest playback setting section which sets a playback portion for digest playback of moving image data automatically set with a priority for each portion of a string of moving images, the digest playback setting section including:

a portion selecting section to select in order from a moving image portion set with a high priority;

a selected time comparing section which compares a total amount of time of a selected moving image portion and a range of digest playback time set in advance each time the moving image portion is selected by the portion selecting section; and a setting section which sets a playback portion of a moving image of a digest playback target, wherein when the selected time comparing section judges that the total amount of time of the selected moving image portion exceeds the range of digest playback time, the moving image portion selected until one time before is set as the playback portion of the moving image of the digest playback target.

BRIEF DESCRIPTION OF THE DRAWINGS

The present invention and the above-described objects, features and advantages thereof will become more fully understood from the following detailed description with the accompanying drawings and wherein.

DETAILED DESCRIPTION OF THE PREFERRED EMBODIMENTS

Below, an embodiment of the present invention is described with reference to the drawings.

[First Embodiment]

First, a moving image capturing apparatus of a first embodiment of the present invention is described.

Figure 1:
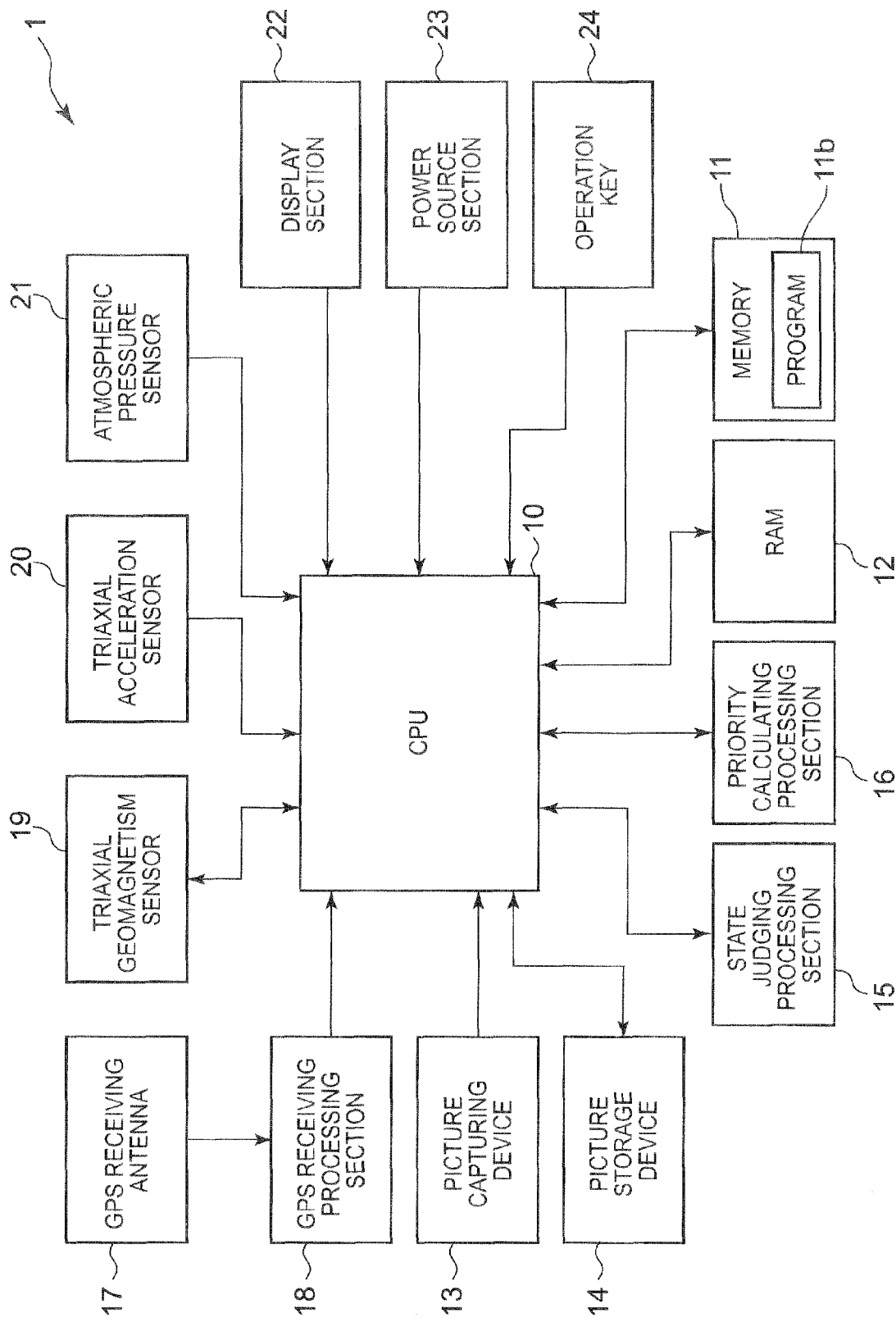
FIG. 1 is a block diagram showing an inner configuration of a moving image capturing apparatus of an embodiment of the present invention.

FIG. 1 is a block diagram which describes an inner configuration of a moving image capturing apparatus of the first embodiment.

The moving image capturing apparatus 1 includes a capturing function and a playback function of a moving image. The moving image capturing apparatus 1 includes a CPU (Central Processing Unit) 10 (time measuring section, digest playback setting section), a memory 11, a RAM (Random Access Memory) 12, a picture capturing device 13 as a capturing section, a picture storage device 14 as a storage section, a state judging processing section 15 as an operation determining section, a priority calculating processing section 16 as a priority setting section, a GPS (Global Positioning System) receiving antenna 17, a GPS receiving processing section 18, a triaxial geomagnetism sensor 19, a triaxial acceleration sensor 20, an atmospheric pressure sensor 21, a display section 22, a power source section 23, an operation key 24 and the like.

The CPU 10 performs various calculating processing and centrally controls operation of the entire moving image capturing apparatus 1. The memory 11 is, for example, a ROM (Read Only Memory). In the memory 11, a program to control the moving image capturing apparatus 1, a moving image capturing program, and a moving image playback program are stored. A digest playback program 11b is included in the moving image playback program. The CPU 10 counts an internal clock signal which is not shown to perform operation as an internal clock which measures time. A separate dedicated counter may be provided to measure the time. The RAM 12 provides a memory workspace in the CPU 10 to temporarily store data.

A capturing lens or an imaging element to perform imaging such as a CCD image sensor or a CMOS image sensor is provided in the picture capturing device 13. The picture storage device 14 stores moving image data (imaging data) captured by the picture capturing device 13. An element to enable reading and writing of data such as a nonvolatile memory such as a flash memory or a hard disk is used in the picture storage device 14. The moving image data captured in the picture capturing device 13 is converted in an arbitrary image format such as MPEG4 to be stored in the picture storage device 14.

The GPS receiving processing section 18 receives a plurality of radio waves transmitted from a positioning satellite using a GPS receiving antenna 17 to decode positioning information from the positioning satellite and calculates the present position based on the positioning information to output the result in a predetermined format to the CPU 10.

The moving image capturing apparatus 1 of the present embodiment includes three types of measuring sensors.

The triaxial geomagnetism sensor 19 is a sensor which measures a geomagnetic field in triaxial directions, for example, a semiconductor sensor which uses a magnetic resistance element. The triaxial acceleration sensor 20 is a sensor which measures acceleration in triaxial directions, for example, measurement using electrostatic capacitance. The atmospheric pressure sensor 21 is a sensor which measures atmospheric pressure, for example a semiconductor sensor which uses piezoresistance.

The state judging processing section 15 judges a moving state (state when moving) of the moving image capturing apparatus 1 based on the measured values of the triaxial geomagnetism sensor 19, the triaxial acceleration sensor 20 and the atmospheric pressure sensor 21. Based on the judged moving state and the time of the moving state, the priority calculating processing section 16 calculates the priority of using the moving image portion of the moving image data stored in the picture storage device 14 corresponding to the moving state and the time when digest playback of the moving image is performed. The CPU which performs such judging processing and calculating processing and the ROM and the RAM storing the table data, temporary setting value, etc. to determine the judging condition can be provided independent from the CPU 10, the memory 11 and the RAM 12, or a common device can be used.

The display section 22 is used to playback the captured moving image or to display various setting screens and the like. A dot matrix type liquid crystal display (LCD) screen is used as the display section 22, however, the display section 22 is not limited to the above. The operation key 24 includes one or a plurality of button switches. As another operation key 24, a touch panel and/or a rotating switch can be provided. When the user operates the operation key 24, an electrical signal based on the content of operation is generated and transmitted to the CPU 10. Then, according to the processing based on the electric signal, switching of various settings and executing of operation instructions are performed.

The power source section 23 supplies electric power for operation of each section of the moving image capturing apparatus 1. The power source section 23 is provided with a cell with an output voltage and capacity according to the electric power necessary in the moving image capturing apparatus 1. The cell is detachable and exchangeable, or the cell is rechargeable by connecting to an external power source. The power source section 23 converts the output voltage of the cell to input voltage for each section of the moving image capturing apparatus 1 according to necessity and outputs the voltage. The electric power supplied to each section from the power source section 23 is not limited to the electric power supplied through the CPU 10 and can be directly supplied to each section.

Next, the capturing operation of the moving image capturing apparatus 1 of the first embodiment is described.

Figure 2:
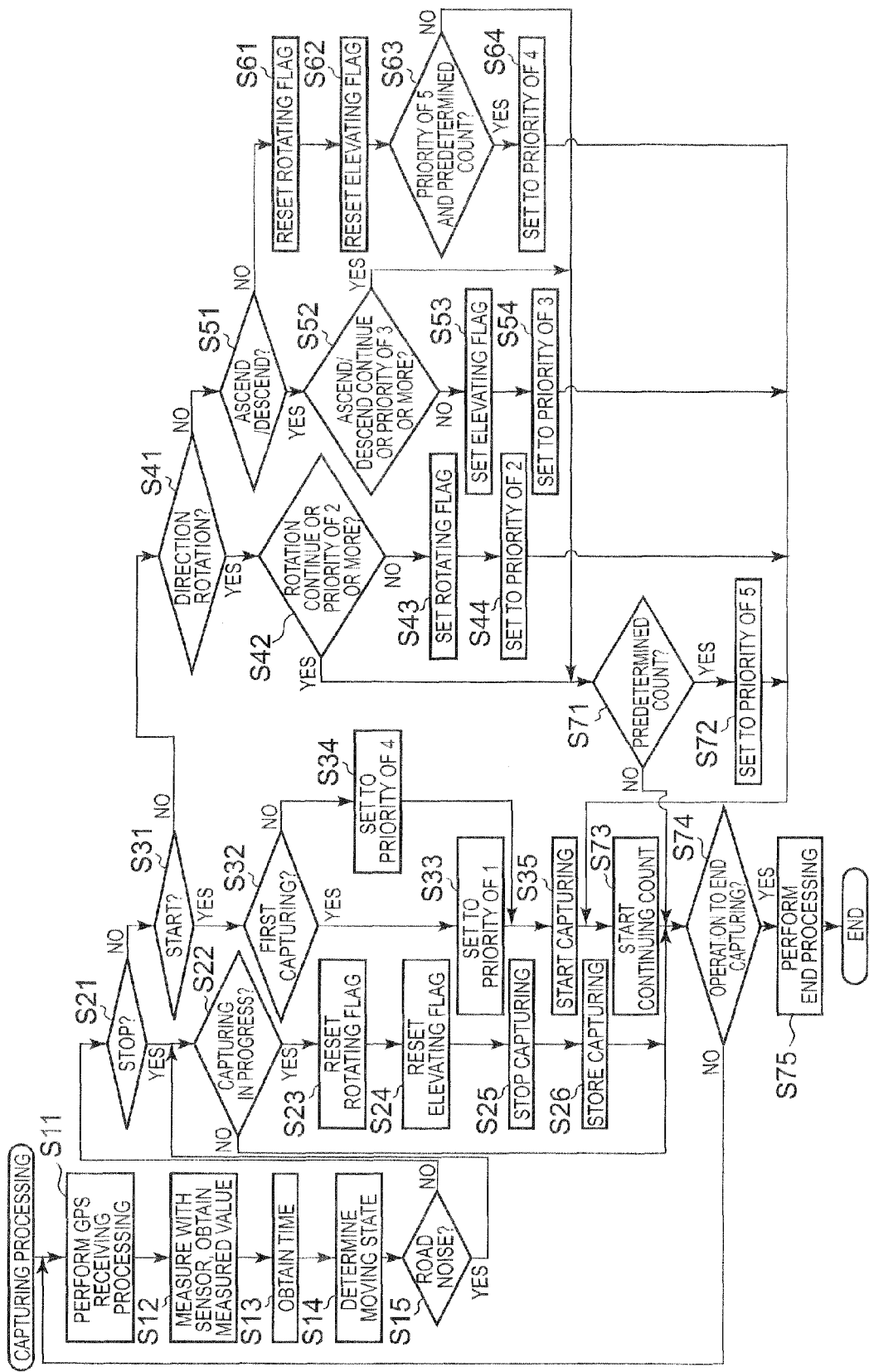
FIG. 2 is a flowchart showing a control process of capturing processing in a moving image capturing apparatus of a first embodiment.

FIG. 2 shows a control process by the CPU 10 of the capturing processing regarding the operation when the moving image capturing apparatus 1 performs capturing.

In the capturing processing of the moving image in the moving image capturing apparatus 1 of the first embodiment, for example, when the moving image capturing apparatus 1 is attached to a bicycle and capturing is performed while moving, the capturing continues with the exception of when movement stops (when the bicycle stops) or when it is judged that there is noise.

When the capturing processing is started, the CPU 10 first performs GPS receiving processing (step S11). Specifically, the CPU 10 turns on the GPS receiving processing section 18 to receive the radio wave from the positioning satellite through the GPS receiving antenna 17, and calculates the present position based on the received radio wave. Then, the CPU 10 obtains the present position data calculated in the GPS receiving processing section 18. The CPU 10 sequentially stores the obtained present position data as the history data of the moved path in the picture storage device 14.

Next, the CPU 10 obtains the measured value from each sensor (step S12). The CPU 10 obtains the measured value of the magnetic field intensity in the triaxial directions from the triaxial geomagnetism sensor 19, the measured value of the acceleration in the triaxial directions from the triaxial acceleration sensor 20, and the measured value of atmospheric pressure from the atmospheric pressure sensor 21. The CPU 10 performs suitable coordinate conversion of the value measured by the triaxial geomagnetism sensor 19 and the triaxial acceleration sensor 20 in the moving image capturing apparatus 1 based on a predetermined identification logic and identifies the posture and the operation of the moving image capturing apparatus 1 in the azimuth direction of north, east, south, and west (horizontal direction), vertical angle direction (inclination angle), and perpendicular direction. The CPU 10 converts the output data of the atmospheric pressure sensor 21 to an altitude value based on table data stored in advance in the memory 11. Among the measured values and calculated values, the CPU 10 temporarily stores in the RAM 12 at least recent data obtained within a predetermined amount of time.

Next, the CPU 10 obtains the present time (step S13). As the present time, the value of the present time measured by the CPU 10 is used, however, it is possible to suitably correct the present time based on the data received from the positioning satellite.

The CPU 10 allows the state judging processing section 15 to determine the moving state of the moving image capturing apparatus 1, in other words the moving state of the user based on the data obtained in the processing of steps S12 and S13 (step S14).

Next, the CPU 10 judges whether or not the determined moving state (state when moving) is "road noise" (step S15). In other words, when vibration acceleration is detected at a predetermined magnitude or more due to unevenness of the moving path such as dirt road, off-road, etc., usually blur of the captured image becomes large and the image becomes difficult to see. Therefore, the state is judged to be "road noise". When the state is judged to be road noise, the processing of the CPU 10 advances to step S22. When the state is judged to be not road noise, the processing of the CPU 10 advances to step S21.

When the processing advances to step S21, the CPU 10 judges whether or not the moving state is the stopped state. Specifically, the CPU 10 judges whether or not the measured value of the triaxial acceleration sensor 20 is only acceleration due to gravity and there is no change or there is no change in the measured value of the atmospheric pressure sensor 21. The CPU 10 can also judge whether or not there is change at a margin of error or more in the position data obtained in the processing of step S11. When it is judged that it is the stopped state, the processing of CPU 10 advances to step S22.

When the processing advances to step S22, the CPU 10 judges whether or not capturing of the moving image is continued at present. When it is judged that the moving image is not being captured, the processing of the CPU 10 advances to step S74. When it is judged that the moving image is being captured, the CPU 10 resets a later described rotating flag and elevating flag (steps S23, S24), and then stops capturing of the moving image (step S25). Then, the CPU 10 performs storing processing of the captured moving image data (step S26). When the capturing is stopped due to road noise, the CPU 10 can store the moving image data to the timing identified as the start of detecting the road noise instead of the point of time when the capturing stopped. Then, the processing of the CPU 10 advances to step S74.

When it is judged in the judging processing of step S21 that it is not the stopped state, the CPU 10 judges whether or not the moving state is the "starting state" (step S31). When the previous moving state is the stopped state and the present moving state is not the stopped state, the CPU 10 judges that the state is the starting state. Alternatively, the CPU 10 can judge that the state is the starting state when the CPU 10 judges that the stopped state continues for a predetermined amount of time and then a state which is not the stopped state continues for a predetermined amount of time. Alternatively, the CPU 10 can judge that the state is the starting state when after road noise is detected, the road noise is no longer detected. When it is judged that the state is the starting state, the CPU 10 judges whether or not the start is the first starting timing in the present capturing (step S32). When it is judged that it is the first starting timing, the CPU 10 sets the priority to "1", and stores the setting in the picture storage device 14 together with the time the priority is set (step S33). Alternatively, when it is judged that it is not the first starting timing, the CPU 10 sets the priority to "4", and stores the setting in the picture storage device 14 associated with the time the priority is set (step S34). When the priority is set in either of the processing of steps S33, S34, the CPU 10 starts capturing (step S35). When the capturing is started, the processing of the CPU 10 advances to step S73. The priority is set so that as the numeric value becomes smaller, the priority becomes higher.

The data of the priority and the time when the priority is set stored in the picture storage device 14 can be included as header information in the moving image data file or a separate priority history file can be made and the data can be added and stored in such file. The data of the captured moving image can be stored divided in a separate file each time a priority is set or scene information (chapter information) including the header information can be inserted in the beginning of the moving image portion in which the priority is set.

Next, when it is judged in the judging processing of step S31 that it is not the starting state, in other words, it is judged that the state is moving continued from the last time the moving state is judged, the CPU 10 judges whether or not the present moving state is a direction rotating state (step S41). The CPU 10 judges whether or not acceleration in the horizontal plane is detected in the output from the triaxial acceleration sensor 20 and whether or not the moving direction identified based on the direction of the acceleration and the magnetic field measured in the triaxial geomagnetism sensor 19 changes in the azimuth direction compared to the moving direction of the last time the moving state is judged. When it is judged that the state is the direction rotating state, the CPU 10 judges whether or not the direction rotating state is continued from last time or the priority is already set to "2" or more (step S42). Here, "or more" means the priority is high. In other words, here, the CPU 10 judges whether or not the priority is "1" or the rotating flag is set (substantially the same as the priority being "2"). When it is judged that the priority is not "1" and the rotating flag is not set, the CPU 10 sets the rotating flag (step S43). Here, when the elevating flag is set, the CPU 10 resets the elevating flag. Moreover, the CPU 10 sets the priority of the portion of the moving image to "2" and stores the priority associated with the time in the picture storage device 14 (step S44).

Here, in order to distinguish the moving at a corner or a curve from wobbling of the bicycle, some time may be necessary. Therefore, instead of the timing that the direction rotation is actually distinguished, a timing at a predetermined amount of time before can be the timing when the priority is set to "2". The predetermined amount of time can be set uniformly (for example, 10 seconds) or the timing when the change in the distinguished direction rotation starts to appear can be detected again by going back each time based on the history of the measured value. When the processing of step S44 ends, the processing of the CPU 10 advances to step S73.

Alternatively, when it is judged that priority "1" is set, the CPU 10 advances the processing to step S71. Moreover, when the rotating flag is set, this means that the priority is set to "2", and the CPU 10 advances the processing to step S71.

In the judging processing of step S41, when it is judged that it is not the direction rotating state, the CPU 10 judges whether or not the moving state is an ascending/descending state (step S51). The CPU 10 judges the ascending/descending state based on the attribute of the change in altitude obtained based on the output of the atmospheric pressure sensor 21, the change in the posture of the bicycle on which the moving image capturing apparatus 1 is mounted obtained by measurement of the triaxial geomagnetism sensor 19, and the change in the acceleration in the vertical (perpendicular) direction obtained by the triaxial acceleration sensor 20. When it is judged that it is the ascending/descending state, the CPU 10 judges whether or not it is judged to be the ascending/descending state continued from the last time the moving state is judged, or whether or not the priority is set to "3" or more (step S52). In other words, here, the CPU 10 checks whether the priority is set to "1" or whether at least any of the rotating flag or the elevating flag is set. When it is judged that the priority is not "1" and any of the rotating flag or the elevating flag is not set, the CPU 10 sets the elevating flag (step S53). Moreover, the CPU 10 sets the priority to "3" and stores the priority associated with the time in the picture storage device 14 (step S54). Then, the processing of the CPU 10 advances to step S73.

Here, in the processing of step S51, a certain amount of time may pass from when the operation of ascending/descending actually starts until the state is judged. In such case, similar to the processing of step S44, it is possible to set the beginning position of the moving image portion with the priority set to "3" in the processing of step S54 to go back a predetermined amount of time from the timing when the judging processing is performed.

In the judging processing of step S52, when it is judged that the priority is set to "1", or, it is judged that the rotating flag is set (in other words, this means the priority is set to "2"), the CPU 10 advances the processing to step S71. Also, when the elevating flag is set (in other words, this means the priority is set to "3"), the CPU 10 advances the processing to step S71.

In the judging processing of step S51, when it is judged that the moving state is not the ascending/descending state, the CPU 10 resets the rotating flag (step S61) or resets the elevating flag (step S62). Then, the CPU 10 judges whether or not the priority presently set is "5" and count value of continuing time from when the priority "5" is set (see later described processing of step S73) reaches a predetermined count (step S63). When it is judged that the priority is "5" and that the count value of the continuing time reached a predetermined count number, the CPU 10 sets the priority to "4" and stores the priority associated with the time of the setting timing in the picture storage device 14 (step S64). Then, the processing of the CPU 10 advances to step S73. When it is judged that the priority is not "5" or the priority is "5" but the count value has not reached the predetermined count, the processing of the CPU 10 advances to step S71.

When the processing advances to the processing of step S71 from any of the processing of steps S42, S52, or S63, the CPU 10 judges whether or not the count value of the continuing time has reached the predetermined count value. When it is judged that the count value has reached the predetermined count value, the CPU 10 sets the priority to "5" (step S72) and then the processing of the CPU 10 advances to step S73. When it is judged that the count value has not reached the predetermined count value, the processing of the CPU 10 advances to step S74.

Here, the predetermined count value for each priority of 1 to 5 can be a different value. For example, only the predetermined count value to set the priority from 5 to 4 (count value in step S63) may be set larger than the other predetermined count values (count value of step S71). Alternatively, the predetermined count value when the priority of 1 to 4 is changed to the priority of 5 in step S71 may be a different value for each of the priority of 1 to 4.

When the priority is set in the processing of steps S33 and S34 and then the processing of step S35 is performed, or when the priority is set in the processing of steps S44, S54, S64 or S72 and then the processing advances to step S73, the CPU 10 starts count of the continuing time from the setting to a certain priority. Then, the processing of the CPU 10 advances to step S74.

When the processing advances to step S74, the CPU 10 judges whether or not the capturing end operation is input using the operation key 24. When it is judged that the end operation is not input, the processing of the CPU 10 returns to step S11 and the processing is repeated from the start of the processing.

Alternatively, when it is judged that the end operation is input in the judging processing of step S74, the CPU 10 performs end processing (step S75), and ends the capturing processing. In the end processing, the CPU 10 sets priority of 1 to the last capturing data portion of the predetermined amount of time and performs storing processing of the capturing data.

FIG. 3A, FIG. 3B, FIG. 4A and FIG. 4B show an example of an image in the moving image captured while moving with a bicycle.

Figure 3A:
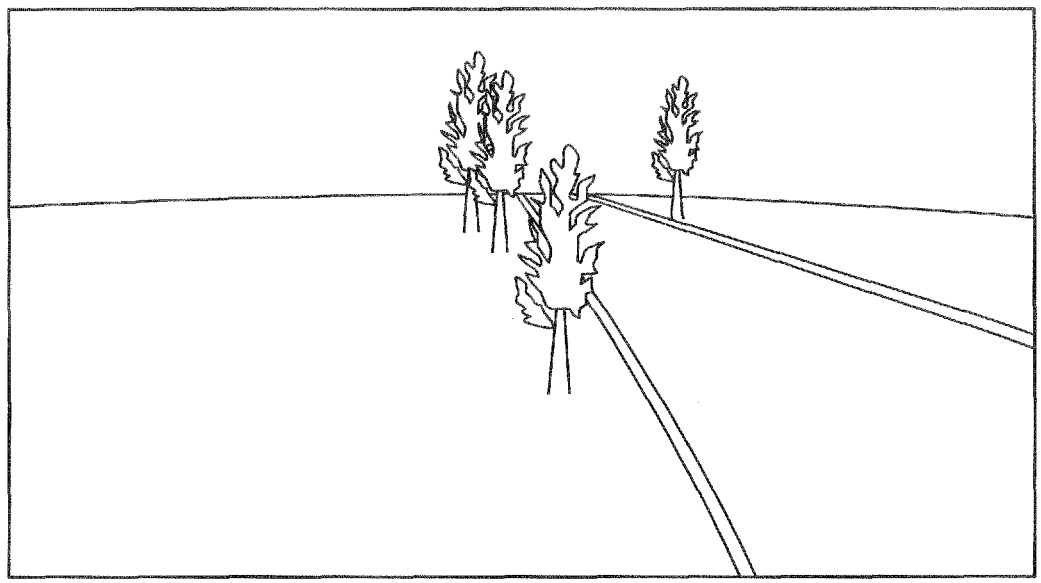
FIG. 3A and FIG. 3B are diagrams showing an example of a scene captured by the moving image capturing apparatus.

First, after preparing to start capturing at the starting point, when moving starts from the starting point shown in FIG. 3A, it is determined that the movement started ("YES" in step S31), and since this is the first starting timing ("YES" in step S32), priority is set to "1" (step S33), and the capturing of the moving image starts (step S35). Then, the count of the continuing time of the priority "1" starts (step S73).

Figure 3B:
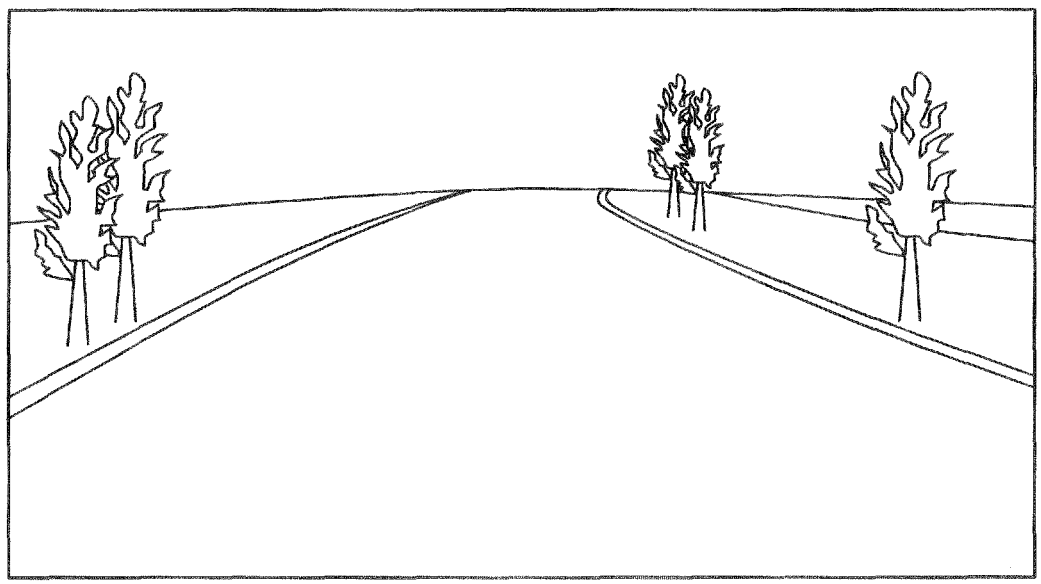

As shown in FIG. 3B, when straight movement continues for a while keeping priority of "1" ("NO" in step S63), then the count value of the continuing time becomes a predetermined count value ("YES" in step S71), the priority is changed to "5" (step S72), and the count value is reset and a new count of continuing time is started (step S73).

Figure 4A:
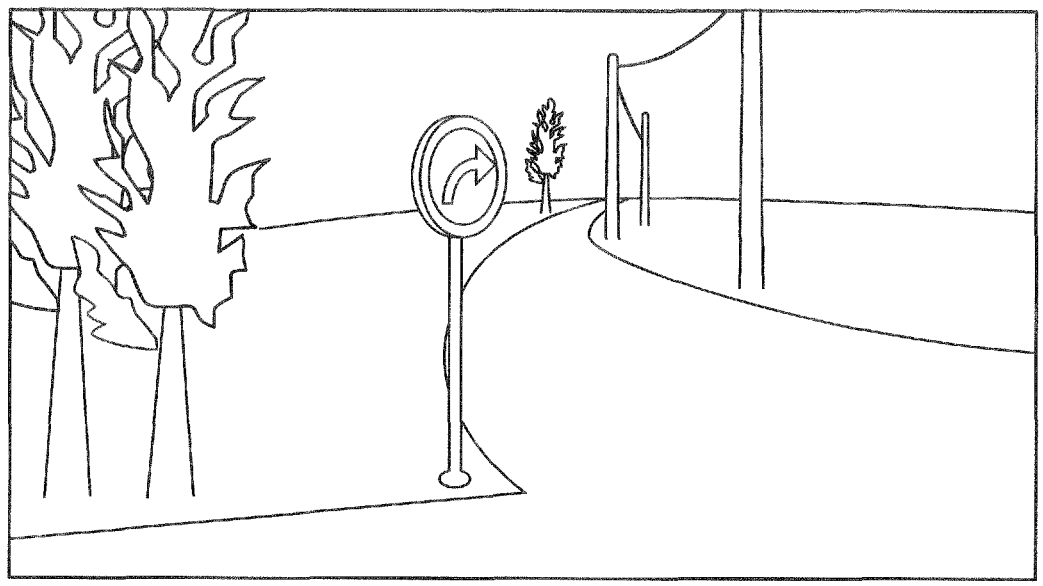
FIG. 4A and FIG. 4B are diagrams showing an example of a scene captured by the moving image capturing apparatus.

Then, as shown in. FIG. 4A, when the bicycle reaches a curve, the direction rotation of the bicycle is detected ("YES" in step S41), the rotating flag is set (step S43) and the priority is set to "2" (step S44). Then, the count value is reset and the count of the continuing time is newly started again (step S73). When the direction rotation continues a predetermined amount of time or more (after "YES" in step S42, "YES" in step S71), or after the direction rotation ends, and then a predetermined amount of time passes ("YES in step S63 and then "YES" in step S71), the priority returns to "5" (step S72).

Figure 4B:
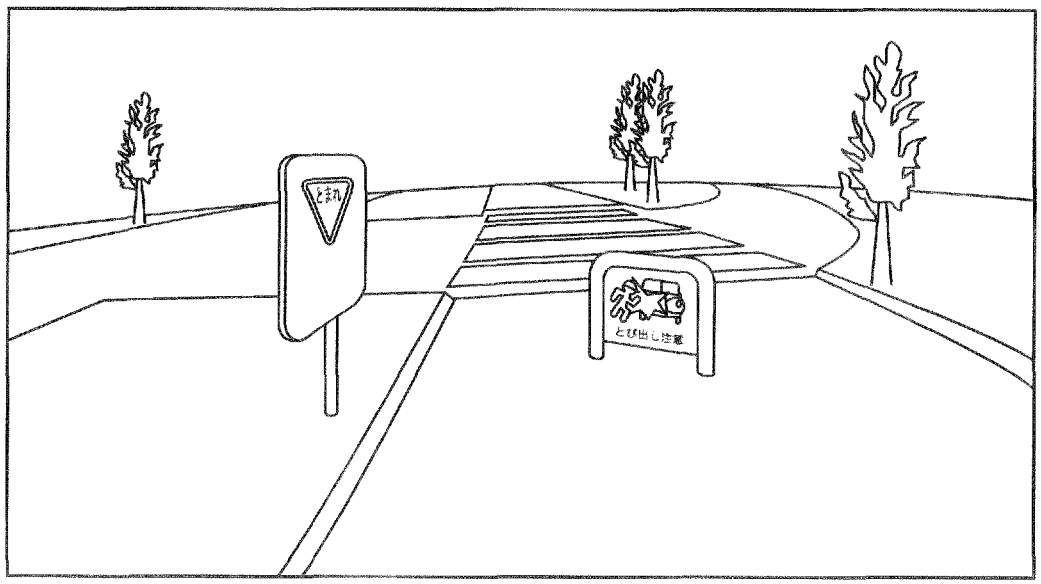

As shown in FIG. 4B, when the bicycle reaches an intersection and stops temporarily, it is determined that the movement stopped ("YES" in step S21) and the capturing stops temporarily (steps S22 to S26). Then, when the bicycle starts again, the start is detected ("YES" in step S31) and the priority is set to "4" ("NO" in step S32, step S34).

Finally, when the bicycle returns to the starting point and stops, it is determined that the movement stopped ("YES" in step S21), the capturing is stopped (steps S22 to S26), and the user performs the capturing end operation ("YES" in step S74) to perform the end processing (step S75) and the capturing processing ends.

Next, the operation of digest playback of the captured moving image is described.

Figure 5:
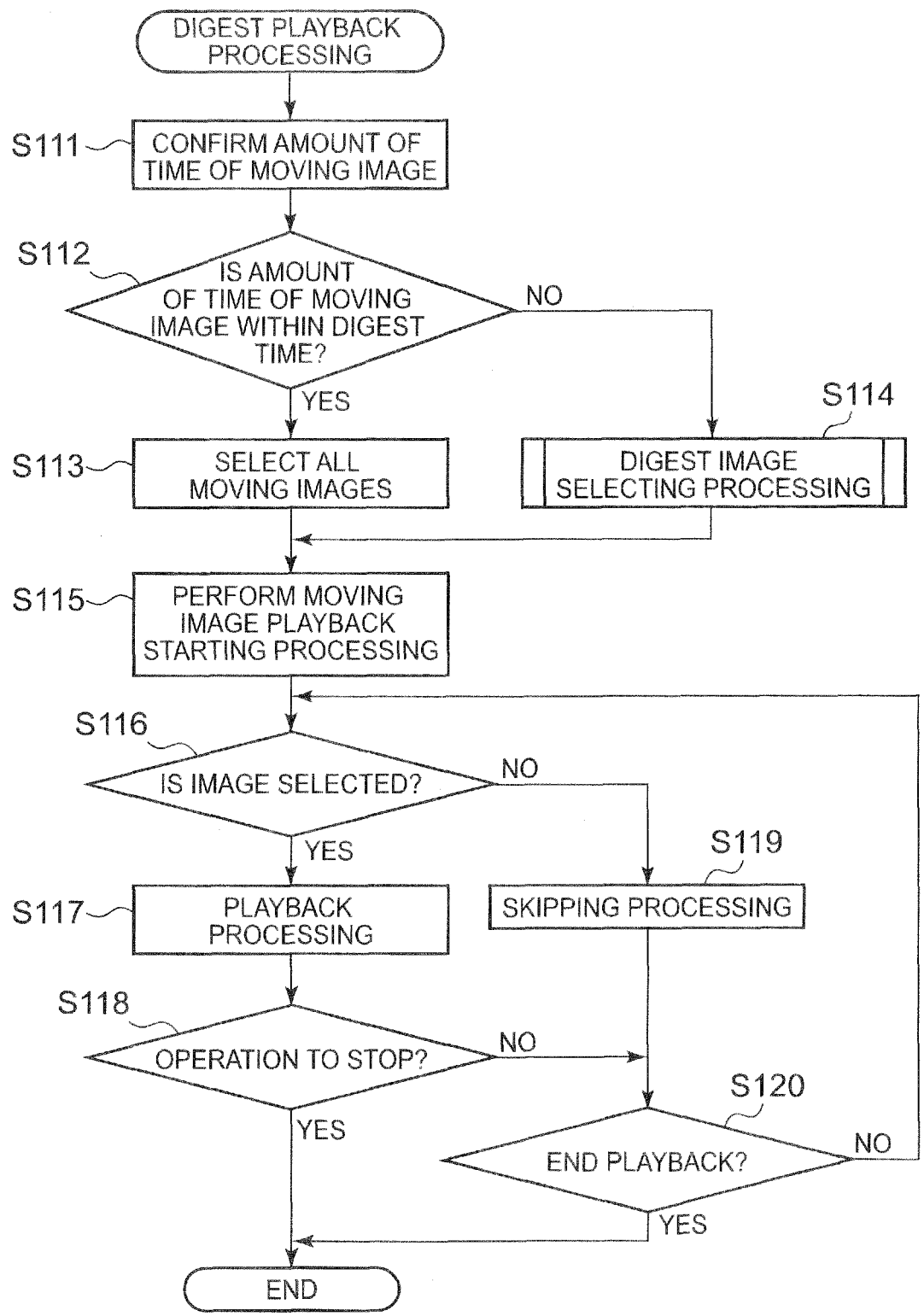
FIG. 5 is a flowchart showing a control process of digest playing processing in the moving image capturing apparatus of the first embodiment.

FIG. 5 is a flowchart showing the control process by the CPU 10 of the digest playback processing executed in the digest playback of the captured moving image.

When the user inputs to the CPU 10 a digest playback instruction of the moving image on the display section 22 by the operation input of the operation key 24, the CPU 10 starts the digest playback processing. The CPU 10 first confirms the total amount of time of the moving image which is the playback target (step S111). Next, the CPU 10 judges whether or not the total amount of time of the moving image is within the amount of time of digest playback set in advance (step S112). When it is judged that the total amount of time of the moving image is within the amount of time of digest playback, the CPU 10 selects all scenes of the moving image as the playback target (step S113). Then, the CPU 10 advances the processing to step S115.

When it is judged that the total amount of time of the moving image is not within the amount of time of digest playback, the CPU 10 transmits an instruction to the priority calculating processing section 16, and while the priority calculating processing section 16 successively calculates a later described true priority, the CPU 10 performs selecting processing of the digest playback target scene from the moving image data based on the true priority (step S114). The processing content of the step S114 is described in detail later.

When the scene selection of the moving image to be played back within the amount of time of digest playback ends, the CPU 10 performs moving image playback starting processing (step S115). The CPU 10 switches to display output to the display section 22 and is able to decode and output moving image data stored in the picture storage device 14.

Next, the CPU 10 selects each scene in the order of recording the moving image and judges whether or not the selected scene is a scene selected as the target of digest playback (step S116). When it is judged to be the selected scene, the CPU 10 performs the playback processing of the scene (step S117). Then, the CPU 10 judges whether or not the stopping operation of the digest playback is performed by the user operation (step S118). When it is judged that the stopping operation is performed, the CPU 10 ends the digest playback processing. When it is judged that the stopping operation is not performed, the CPU 10 advances the processing to step S120.

In the judging processing of step S116, when it is judged that the selected scene is not the scene selected as the digest playback target, the CPU 10 performs skipping processing of playback of the scene (step S119). Then, the processing of the CPU 10 advances to step S120.

When the processing advances to step S120, the CPU 10 judges whether or not the playback of all of the scenes which are selected is finished. Specifically, the CPU 10 judges whether or not the scene played back or skipped in the processing of step S117 or step S119 is the last scene of the moving image of digest playback. Then, when it is judged that the playback is not finished, the processing of the CPU 10 returns to step S116, and the judging processing of whether or not to playback the next selected scene is performed. When it is judged that the playback is finished, the CPU 10 ends the digest playback processing.

Next, the selecting processing of the digest playback target scene in the moving image capturing apparatus 1 of the present embodiment is described.

Figure 6:
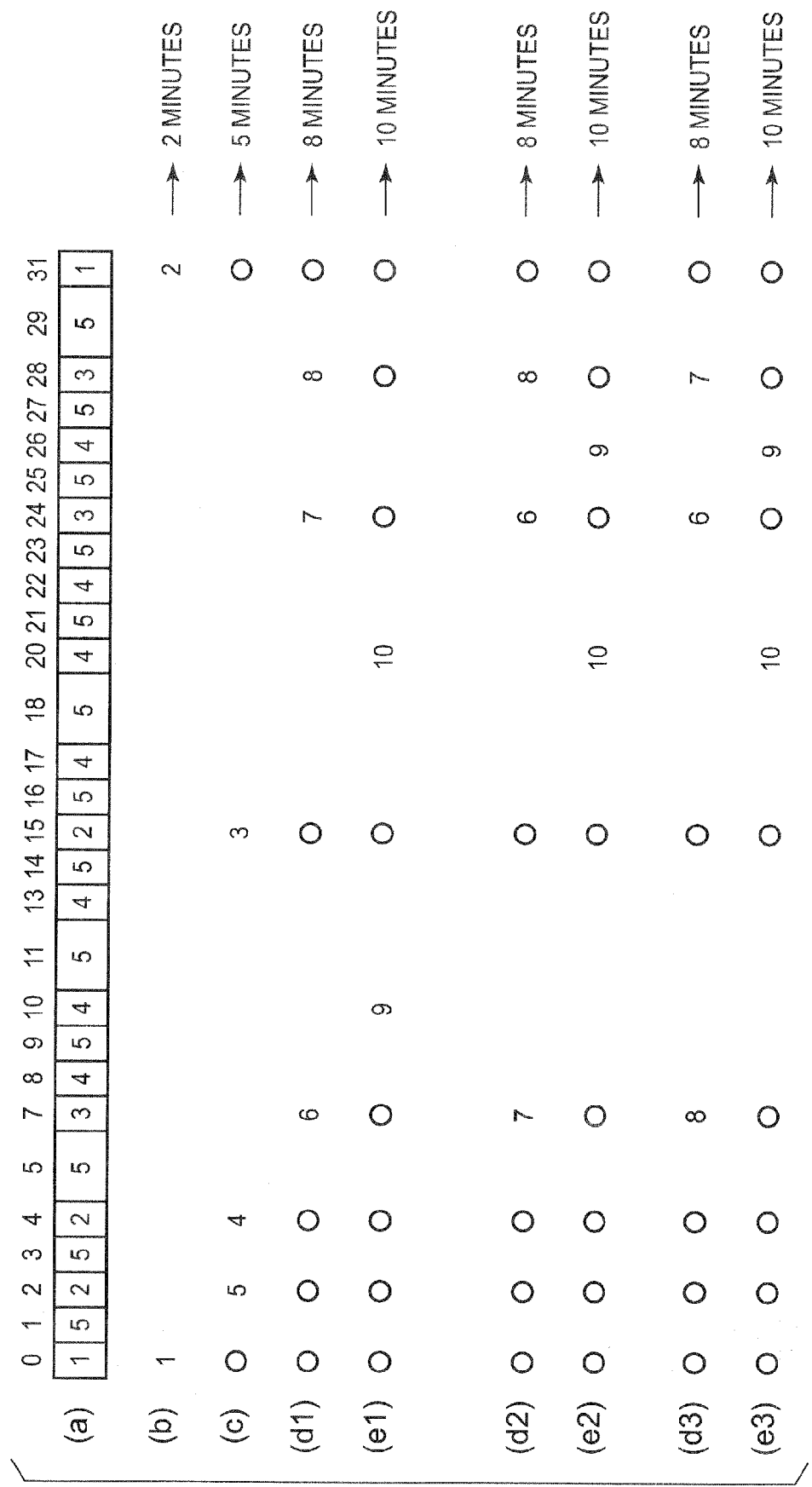
FIG. 6 is a diagram to describe a selection of a scene when digest playback is performed from a picture captured by the moving image capturing apparatus of the first embodiment.

FIG. 6 is a diagram describing an example of setting priority of each scene of the moving image data captured in the moving image capturing apparatus 1 and scene selection of digest playback.

The arrangement of the moving image data in a time series is shown by (a) of FIG. 6. In the column array showing the moving image, the length in the horizontal direction corresponds to the amount of time of capturing from the beginning of the moving image. Each scene is divided with the vertical line, and as described above, each scene is set with a priority shown by the numbers 1 to 5. The number described at the top of each scene is the scene number of each scene and shows the time of the beginning of the scene. In other words, in (a) of FIG. 6, for the purpose of simplicity, moving image data of 32 minutes is divided to each scene in a unit of one minute, and only four scenes with a priority of 5 are set continuously for 2 minutes.

Here, the scene selection when the amount of time of digest playback is set to 10 minutes is described. First, scenes 0, 31 with a priority of 1 set in both edges of the moving image data are selected ((b) of FIG. 6). The total amount of time of these two scenes is 2 minutes, and is shorter than the digest playback time.

Next, the scene with priority of 2 is selected. Here, in the moving image capturing apparatus 1 of the present embodiment, regarding the scenes with the same priority, the scene where the difference in time from the selected scene on one side and the difference in time from the selected scene on the other side are more even and larger is selected with priority. Various methods of selecting such scenes can be used and in the moving image capturing apparatus 1, a "true priority" calculated as described below is used as an index to determine the selection order within the same priority.

In the calculation of the true priority, for example, it is possible to use a difference Dt showing the difference of time from the beginning time of the selected scenes on both sides.

$$Dt = |(\alpha - Tp) - (T1 - \alpha)| \qquad (1)$$

Here, $\alpha$ represents the beginning time of the scene which is the selection candidate, Tp represents the beginning time of the selected scene on the front side and T1 represent the beginning time of the selected scene on the rear side.

Here, the selected scenes on both sides are the first scene (beginning time=0) and the last scene (beginning time=31). The scenes with the priority of 2 are three scenes which are scenes 2, 4 and 15. Therefore, the difference Dt of these scenes are each 27, 23, and 1, respectively. As these values become smaller, the scene is separated from each selected scene on both sides more evenly. Therefore, first, scene 15 is selected. With this, the total amount of time of the selected scenes becomes 3 minutes, but this is still shorter than the set amount of time of the digest.

Next, due to the selection of scene 15, the true priority of the remaining two scenes change, and therefore the true priority is calculated again. The true priority of the scenes 2 and 4 become 11 and 7 respectively. Therefore, scene 4 is selected. With this, the total amount of time of the selected scenes becomes 4 minutes, but still this is shorter than the set amount of time of the digest. Then, finally, scene 2 is selected ((c) of FIG. 6). With this, when all of the scenes with the priority of 2 are selected, and the total amount of time of the selected scenes is still shorter than the set amount of time of digest playback, then, the scenes with the priority of 3 are selected in order as the target of digest playback.

In the moving image, there are three scenes with the priority of 3. Therefore, similarly, the scenes are selected in order. Here, between the scene 7 and the scenes 24 and 28, the selected scenes before and after the specific scene are different. In such case, as the method of scene selection based on the true priority, the method can be selected from a plurality of methods provided below.

As the first method, two adjacent scenes already selected are specified in order from the beginning of the moving image, and it is judged whether or not there is a scene with the priority of 3 which is the candidate of selection between the scenes. Then, when there is such scene, one scene with the highest true priority is selected from the scenes. Then, the specification of the two scenes is sequentially advanced to the rear. When this method is used, as shown in FIG. 6 (d1), first, since there is no scene with the priority of 3 in between scenes 0 and 2 and scenes 2 and 4, the scenes are skipped. Next, since there is one scene 7 with the priority of 3 in between scenes 4 and 15, scene 7 is selected. Then, since there are scenes 24 and 28 with priority of 3 in between scenes 15 and 31, the scene with the highest true priority (the scenes with the smallest difference Dt) is selected among these scenes. Here, scene 24 is selected. When the specified scene reaches the last scene 31, and still the total amount of time of the selected scenes is shorter than the digest playback time and all of the scenes with the priority of 3 is not selected, after the true priority for the remaining scenes is calculated again, the scenes are specified and selected again from the beginning and finally scene 28 is selected.

As the second method, first, the true priority for all of the scenes with the priority of 3 is calculated. Then, the scenes are sequentially selected from the high true priority. In this case, as shown in FIG. 6 (*d*2), the scenes are selected in the order of scene 24, scene 7, and scene 28.

As a modification of the second method, the true priority is calculated again each time one scene is selected from the scene with the high true priority among the scenes with the priority of 3. In this case, as shown in FIG. 6 (*d*3), the scenes are selected in the order of scene 24, scene 28, and scene 7.

Here, the difference Dt of the scene a which is the candidate of selection between an interval where the length between the two scenes Tp and T1 in the front and the rear is short tends to be small and many scenes are selected from the short interval. Therefore, when the true priority is calculated, it is possible to consider the length between the scenes. For example, it is possible to obtain the true priority P from the following equation.

$$P=L/Dt \qquad (2)$$

Here, L shows the length between the two scenes Tp and Tl in the front and the rear, and as P becomes higher, the true priority becomes higher.

Alternatively, when obtaining the true priority P, for example, it is possible to use a value such as a product of $(\alpha-Tp)\times(T1-\alpha)$ instead of the difference Dt.

When all of the scenes with the priority of 3 is selected, the total amount of time selected as the digest playback time is eight minutes. This is still shorter than the amount of time of digest playback, and therefore the target of digest playback is further selected from the scenes with the priority of 4.

As shown in (a) of FIG. 6, there are seven scenes with the priority of 4. When two scenes are selected from the scenes with the priority of 4, the amount of time becomes the set digest playback time which is 10 minutes. As described above, the method of calculating the true priority and the scenes selected according to the order of selection is different as shown in FIG. 6 (*e*1) to (*e*3). However, in any case, the scene which is evenly separated from the selected scenes on each side is selected with priority.

Figure 7:
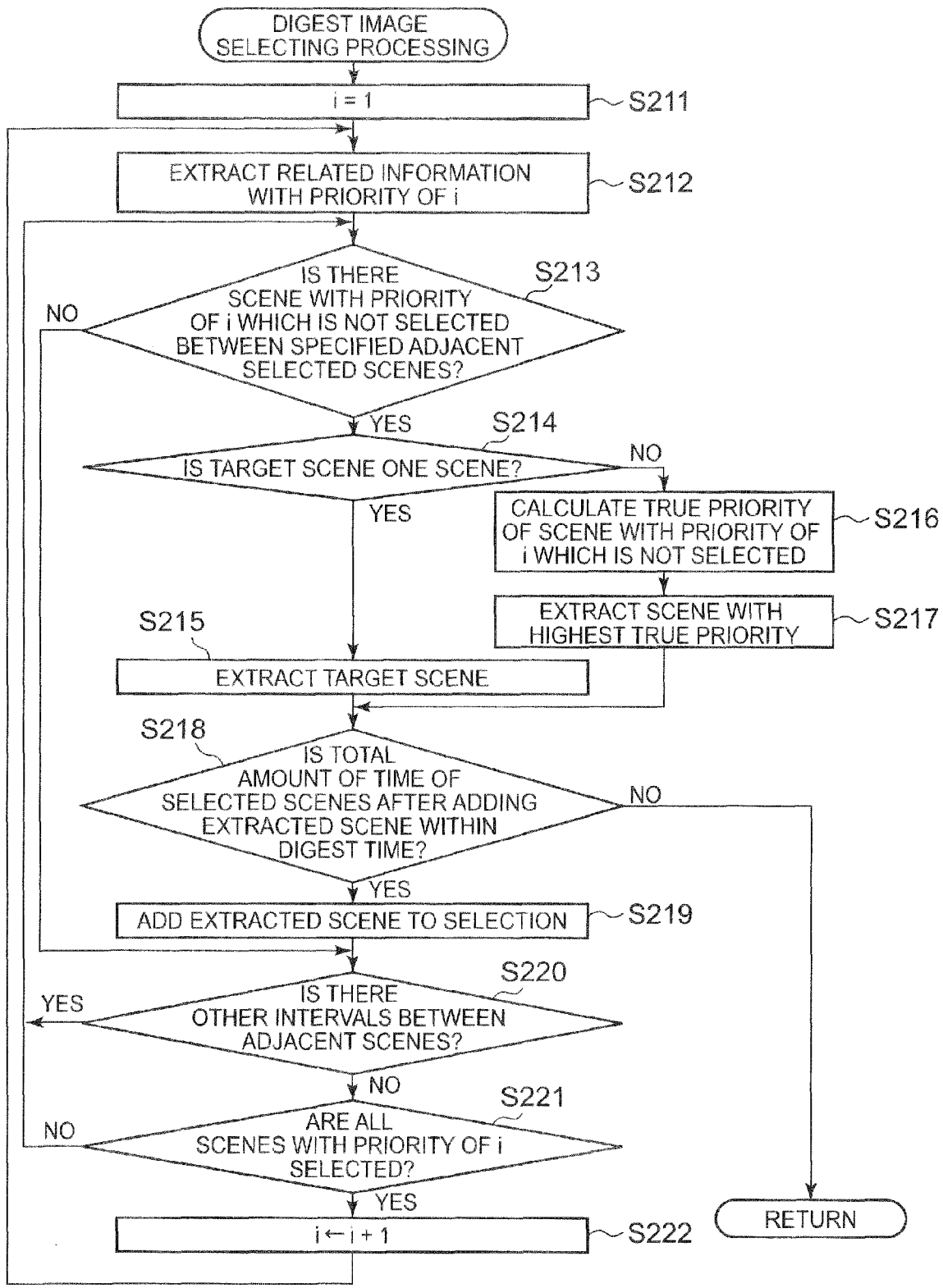
FIG. 7 is a flowchart showing a control process of the digest image selecting processing called in the digest playback processing.

FIG. 7 is a flowchart showing a control process based on a first method of selecting processing of a digest playback target scene called in the digest playback processing.

The CPU 10 first sets the variable i to 1 and the total time to 0 (step S211). Then, the CPU 10 extracts related information of the scene with the priority equal to the variable i (hereinafter referred to as priority of i) (step S212). Here, the related information includes information of the beginning time of the scene and the amount of time the scene continues.

Next, the CPU 10 specifies two adjacent scenes which are already selected in order from the beginning side of the moving image and judges whether or not there is a scene with the priority of i included between the two specified scenes (step S213). In the first stage, the position of both edges including the scenes of the beginning and the end of the moving image are virtually considered to be selected. Moreover, in the stage later where the scenes at the beginning and the end of the moving image are not selected, the interval between the virtually selected position on the beginning side of the moving image and the first selected scene, and the interval between the last selected scene and the virtually selected position on the end side of the moving image are included in the judging processing.

When it is judged that the scene with the priority of i is not included between the two specified scenes, the processing of the CPU 10 advances to step S220. When it is judged that the scene with the priority of i is included, the CPU 10 judges whether or not the number of scenes included is one scene (step S214). When it is judged that the scene included is one scene, the CPU 10 extracts the scene (step S215) and advances the processing to step S218. When it is judged that there is a plurality of scenes included, the CPU 10 allows the priority calculating processing section 16 to calculate the true priority of the plurality of scenes (step S216). Then, the CPU 10 extracts the scene with the highest resulting true priority (step S217) and the processing advances to step S218.

When the processing advances to step S218, the CPU 10 obtains the amount of time the scene continues from the related information of the extracted scene and judges whether or not the total amount of time after adding the amount of time the scene continues is within the digest playback time. When it is judged not to be within the digest playback time, the CPU 10 ends the selecting processing of the digest playback target scene without adding the extracted scene to the digest playback.

When it is judged to be within the digest playback time, the CPU 10 adds the extracted scene to the scene selected for digest playback (step S219). Then, the processing of the CPU 10 advances to step S220.

When the processing advances to step S220, the CPU 10 judges whether or not to advance the specified two scenes one scene to the rear. When it is judged that all of the intervals between two scenes are not yet specified and that it is possible to advance to the rear, the CPU 10 specifies the interval between two scenes advanced to the rear and returns the processing to step S213. When it is judged that all of the intervals between two scenes are specified, the CPU 10 next judges whether or not all of the scenes with the priority of i are selected (step S221). When it is judged that all of the scenes with the priority of i is not yet selected, the specifying of the interval between two scenes returns to the beginning and the processing of steps S213 to S220 is repeated on the scene with the priority of i which is not extracted in step S217.

When it is judged that all of the scenes with the priority of i is selected, the CPU 10 adds 1 to the variable i (step S222). Then, the processing of steps S212 to S221 is repeated on the scene with the priority of i which is one less.

Figure 8:
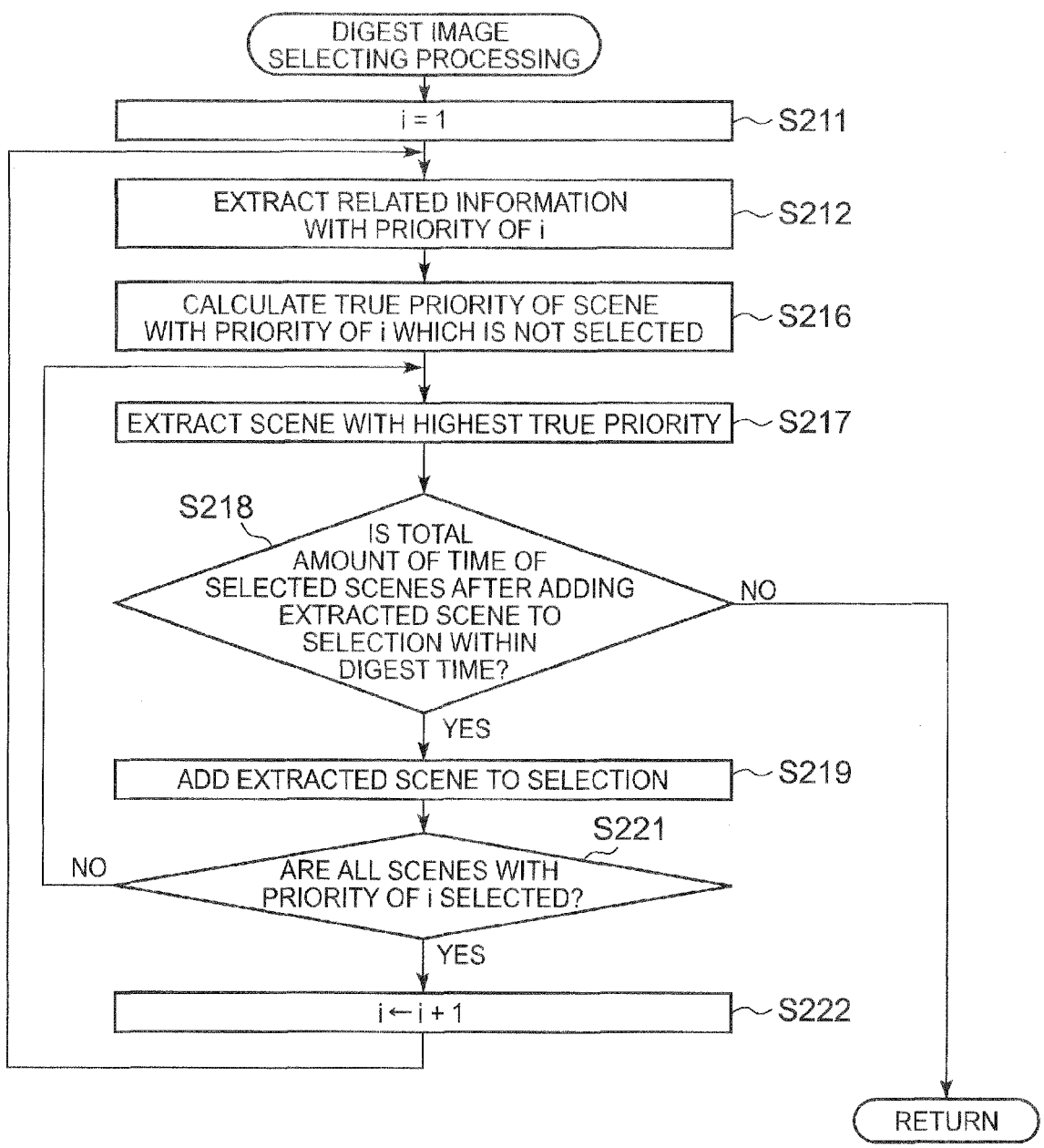
FIG. 8 is a flowchart showing another example of the digest image selecting processing.

FIG. 8 is a flowchart showing the control process based on the second method of processing of selecting processing of a digest playback target scene called in the digest playback processing.

In the second method, the processing of steps S213, S214, S215, S220 in the flowchart of FIG. 7 is removed and a part of the flow of the flowchart is changed. The processing with the same content of control as FIG. 7 is referred with the same reference numeral and the specific description is omitted.

In step S212, when the related information of the priority of i is extracted, the CPU 10 allows the priority calculating processing section 16 to calculate the true priority of all of the scenes with the priority of i (step S216). Then, the CPU 10 extracts the scene with the highest resulting true priority and selects the scenes in order so that the total time is within the range of the digest playback time (steps S217 to S221).

Figure 9:
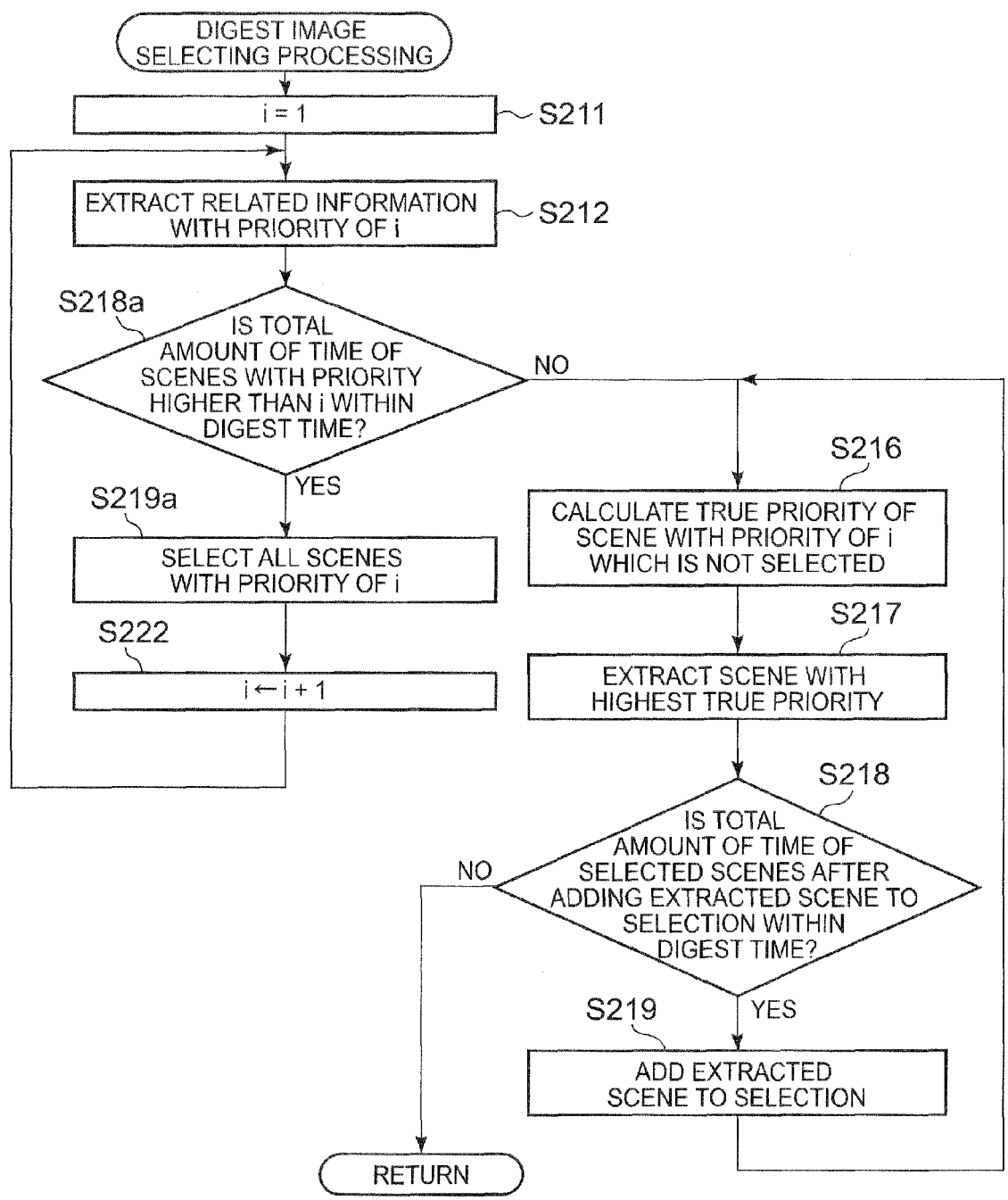
FIG. 9 is a flowchart showing another example of the digest image selecting processing.

FIG. 9 is a flowchart showing a control process based on a modification of the second method of selecting processing of a digest playback target scene called in the digest playback processing.

In the modification, steps S218*a* and S219*a* are added instead of step S221 in the flowchart of FIG. 8 based on the second method and a part of the flow of the flowchart is changed. The processing with the same content of control as FIG. 8 is referred with the same reference numeral and the specific description is omitted.

When the related information of the priority of i is extracted by the processing of step S212, the CPU 10 calculates the total amount of time of the scene with the priority of i or more based on the related information and judges whether or not the total amount of time is within the digest playback time (step S218a). Then, when it is judged that it is within the digest playback time, the CPU 10 collectively selects all of the scenes with the priority of i (step S219a). Then, the processing of CPU 10 advances to step S222 and 1 is added to the variable i.

When it is judged that the total amount of time of the scene with the priority of i or more is not within the digest playback time, the processing of the CPU 10 advances to step S216 and the processing the same as the above described second method is performed (steps S216 to S219). In the modification, each time the CPU 10 adds the extracted scene to the selected scene in the processing of step S219, the CPU 10 calculates the true priority again in step S216. Therefore, the scene adjacent to the selected seen is reset to a lower true priority.

As described above, when one scene is selected, the true priority within the same priority of i changes only for the scene adjacent to the selected scene. Therefore, the CPU 10 can calculate and reset the true priority only for such scene in the processing of step S216.

As described above, the moving image capturing apparatus 1 of the first embodiment includes a picture capturing device 13, a picture storage device 14 which stores the captured moving image data and the priority information for each portion of the moving image, and three sensors which are the triaxial geomagnetism sensor 19, the triaxial acceleration sensor 20 and the atmospheric pressure sensor 21. Based on the data measured by the three sensors when the moving image is captured, the state judging processing section 15 judges the moving state of the moving image capturing apparatus 1, in other words the moving state of the user, and according to the judgment result, the priority calculating processing section 16 calculates the priority of the moving image portion. The priority information is stored in the picture storage device 14 as added information of the moving image data together with the time information. Therefore, based on the priority of each moving image portion, the output portion and the omitted portion in digest playback of the moving image can be set. Therefore, when the moving image including a large amount of unnecessary capturing portions as in capturing performed throughout a motion is played, digest playback of the moving image within a desired amount of time can be easily realized without trouble to the user.

Moreover, when the capturing object (capturing target) is not clearly set in advance, or the user cannot easily operate the camera because the user is operating a bicycle, a motorcycle, or a car, digest playback of the moving image in which the moving image portions with highlights are selected with priority can be performed based on the measurement data of the three sensors.

By setting a plurality of priorities, the digest playback portions can be set in order from the high priority within the range of the digest playback time desired by the user. Therefore, it is possible to set the portions of digest playback flexibly and easily regardless of the length of the digest playback time.

When a plurality of portions of the moving image is set with the same priority, and all of, the moving image portions with the same priority cannot be selected, the moving image portion which has a large difference in time from the selected adjacent moving image portion or the beginning and end of the moving image, and which is separated evenly on both sides is selected with priority. Therefore, the portions of digest playback are not concentrated to a certain portion, and can be selected evenly.

In digest playback, it is not necessary to set all of the moving image portions set with the priority as the playback target, and by uniformly extracting only portions of a predetermined amount of time or a predetermined ratio within the moving image portions, it is possible to select the moving image portion without concentration to a certain moving image portion even if the digest playback time is short.

When it is assumed that the image is disturbed due to shake, etc. and a desired moving image is not obtained based on the measurement data of the three sensors, it is possible to stop capturing so as not to perform unnecessary capturing processing.

Similarly, in an interval where the motion temporarily stops (the vehicle stops), it is possible to pause capturing automatically, therefore it is possible to remove the trouble of on and off operation of capturing each time at a signal, etc. while moving.

When a certain detected state continues for a long time, the period with the corresponding priority is ended in a predetermined amount of time. Therefore, it is possible to prevent digest playback where a similar state continues for a long period of time.

In curves, slopes, etc., there is a possibility of a difference between the timing that the motion actually comes to the curve or the slope and the timing that such state is judged by the three sensors. Therefore, when the state is judged, it is possible to set the moving image portion corresponding to such state to the portion captured before. Therefore, it is possible to set the suitable period.

By using the triaxial geomagnetism sensor 19, the triaxial acceleration sensor 20 and the atmospheric pressure sensor 21 as sensors, it is possible to cover and identify whether or not there is motion and the movement on the horizontal plane and the vertical plane three dimensionally. Therefore, it is possible to accurately detect the change of the moving state.

Based on the moving image data including the priority information as added information, it is possible to configure a program which can perform suitable digest playback on not only the display section 22 of the moving image capturing apparatus 1 but on other moving image playback apparatuses.

[Second Embodiment]

Next, the moving image capturing apparatus of the second embodiment is described.

The inner configuration of the image capturing apparatus 1 of the second embodiment is the same as the inner configuration of the moving image capturing apparatus 1 of the first embodiment shown in FIG. 1, therefore, the detailed description is omitted and the second embodiment is described below using the same reference numerals.

The moving image capturing apparatus 1 of the second embodiment is different from the moving image capturing apparatus 1 of the first embodiment in that when the moving image is captured, the capturing is paused in scenes other than the scenes set with a priority of 4 or more (in other words, priority of 1 to 4).

Figure 10:
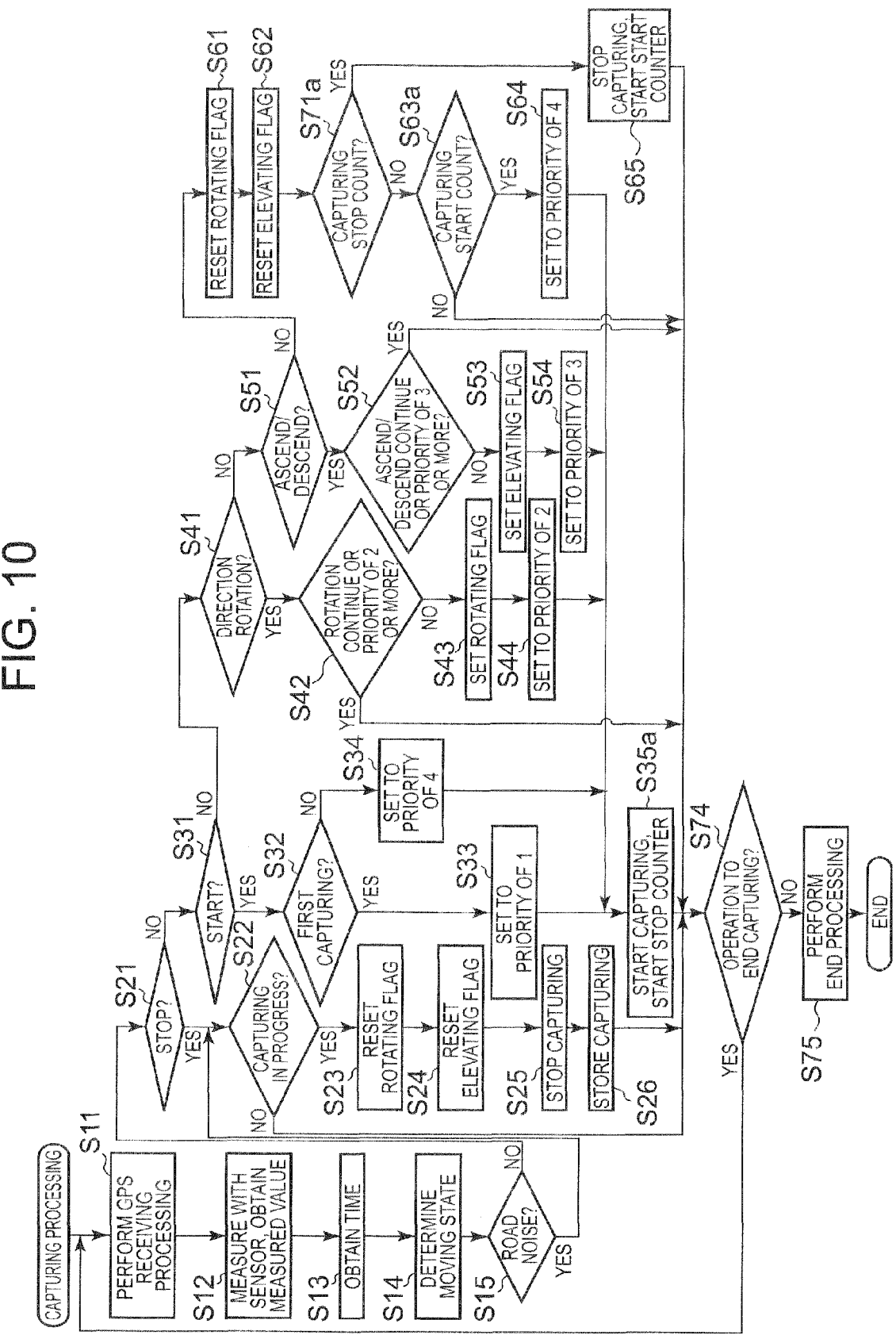
FIG. 10 is a flowchart showing a control process of capturing processing in a moving image capturing apparatus of a second embodiment.

FIG. 10 is a flowchart showing a control process of the capturing processing performed by the CPU 10 in the moving image capturing apparatus 1 of the second embodiment.

The capturing processing in the moving image capturing apparatus 1 of the second embodiment is different from the capturing processing of the moving image capturing apparatus 1 of the first embodiment in that the processing of steps S63 and S71 are changed to the processing of steps S63a and S71a respectively, the processing of steps S35 and S73 are collectively changed to the processing of step S35a, and instead of the processing of step S72, the processing of step S65 is performed. The order of the flowchart is also changed.

The other processing is the same as the other processing of the first embodiment. Therefore, the same reference numerals are applied and the description is omitted.

In the capturing processing, when the capturing starts in the processing of step S35a, the CPU 10 starts count of a stop counter. Then, after it is judged in the processing of step S51 that the ascending/descending operation is not detected and the rotating flag and the elevating flag is reset (steps S61, S62), the CPU 10 judges whether or not the value of the stop counter reaches a predetermined capturing stop count (step S71a). Then, when it is judged that the value reaches the capturing stop count, the CPU 10 stops the capturing by the picture capturing device 13 and starts count of a start counter (step S65). Here, the CPU 10 stops the count operation of the stop counter and resets the count value. Then, the processing of the CPU 10 advances to step S74.

In the judging processing of step S71a, when it is judged that the value has not reached the capturing stop count, next, the CPU 10 judges whether or not the value of the start counter reaches a predetermined capturing start count (step S63a). When it is judged that the value of the start counter reaches the capturing start count, after setting the priority to 4 (step S64), the CPU 10 advances the processing to step S35a and restarts the capturing operation. When it is judged that the value of the start counter has not reached the capturing start count, the processing of the CPU 10 advances to step S74.

In other words, in the moving image capturing apparatus 1 of the second embodiment, when the value of the stop counter reaches the capturing stop count while maintaining the capturing operation in a state of the priority of 4, the capturing operation is stopped. When the state of the priority of 2 or 3 continues, the count operation of the stop counter is performed, but the capturing operation is not stopped. When the capturing operation is stopped while moving, when conversion of direction or ascending/descending is detected or the start counter reaches the capturing start count, the capturing is restarted.

When the setting of the priority is changed during the capturing operation and the processing advances to step S35a, the CPU 10 can change only the scene while continuing the capturing operation.

As described above, according to the moving image capturing apparatus 1 of the second embodiment, in a portion where a lengthy interval of movement in a straight line continues, it is possible to automatically identify such portion based on the counted data of the value measured by the triaxial geomagnetism sensor 19, the triaxial acceleration sensor 20, and the atmospheric pressure sensor 21 and the time and to temporarily stop capturing. Therefore, it is possible to secure free space of the picture storage device 14 without performing needless capturing and to save consumption of energy used in capturing to enable use of energy in capturing for long periods of time.

The present invention is not limited to the embodiments above and various changes can be made.

For example, according to the above embodiments, the moving state is judged using the triaxial geomagnetism sensor 19, the triaxial acceleration sensor 20, and the atmospheric pressure sensor 21. However, other measurement sensors can be used such as a gyro sensor. The judging is not limited to detecting the direct moving state of the movement of the user, and for example, an illuminance sensor can be used to additionally judge a surrounding state when moving so that a plain area during the day is set with higher priority than nighttime, in a tunnel, or a wooded area.

The judged moving state is not limited to those shown in the embodiments described above, and the specific priority can be suitably set. For example, when the home of the user is the starting point, it is not necessary to include the starting point in the digest image. Moreover, it is possible to set an interval where the movement is smooth in a straight line to a higher priority than an interval in a serpentine line.

The moving image capturing apparatus 1 of the above embodiments can record sound also.

According to the above described embodiments, a priority is set for all captured scenes. However, priority may not be set for scenes with a priority of a predetermined level or lower. In such digest playback, even if the total amount of time of the scenes set with a priority is Shorter than the digest playback time, it is possible not to include scenes which are not set with the priority.

The above described embodiments describe an example where moving images of a predetermined amount of time are selected from moving images captured for a long period of time and then played back, however, it is possible to set the capturing time itself short based on the setting of the priority. Such moving image captured and stored in this way is already short, therefore the moving image can be simply readout and displayed in playback.

The above description discloses an example where a memory 11 such as a hard disk or a flash memory is used as a computer readable medium including the program 11b regarding the present invention. However, the present invention is not limited to the above. As other computer readable mediums, other non-volatile memories such as an EEPROM (Electrically Erasable and Programmable Read Only Memory), a ROM or a portable storage medium such as a CD-ROM can be used. As the medium which provides data of the program regarding the present invention through a communication line, a carrier wave can be applied to the present invention.

The specific configuration and the detailed portions such as the order, numeric value and the like shown in the detailed description of the embodiment can be suitably changed without leaving the scope of the present invention.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2012-064287 filed on Mar. 21, 2012 including specification, claims, drawings and abstract are incorporated herein by reference in its entirety.

What is claimed is:

1. A moving image capturing apparatus comprising:
   a capturing section which captures a moving image;
   a sensor which performs measurement to detect a state when moving;
   an operation judging section which judges a type of state when moving based on a measured value of the sensor;
   a priority setting section which sets a priority for a moving image portion corresponding to a period judged with the type of state in a moving image captured by the capturing section according to the type of state judged by the operation judging section based on a predetermined standard; and
   a storage section which stores the priority set by the priority setting section corresponded with the moving image portion;
   wherein the capturing section stops capturing of the moving image during a period in which a priority of a predetermined level or more is not set by the priority setting section.

2. A moving image capturing apparatus comprising:
a capturing section which captures a moving image;
a sensor which performs measurement to detect a state when moving;
an operation judging section which judges a type of state when moving based on a measured value of the sensor;
a priority setting section which sets a priority for a moving image portion corresponding to a period judged with the type of state in a moving image captured by the capturing section according to the type of state judged by the operation judging section based on a predetermined standard; and
a storage section which stores the priority set by the priority setting section corresponded with the moving image portion;
wherein when a predetermined amount of time passes from a timing that a certain priority is set or a higher priority is set over the certain priority, the priority setting section ends a period which is set with the certain priority.

3. A digest playback setting apparatus which sets a playback portion for digest playback of moving image data automatically set with a priority for each portion of a string of moving images, the digest playback setting apparatus comprising:
a portion selecting section to select in order from a moving image portion set with a high priority;
a selected time comparing section which compares a total amount of time of a selected moving image portion and a range of a digest playback time set in advance each time the moving image portion is selected by the portion selecting section; and
a setting section which sets a playback portion of a moving image of a digest playback target, wherein when the selected time comparing section judges that the total amount of time of the selected moving image portion exceeds the range of the digest playback time, the moving image portion selected until one time before is set as the playback portion of the moving image of the digest playback target;
wherein when there are a plurality of moving image portions with a same priority and the total amount of time of the selected moving image portion exceeds the range of the digest playback time if all of the moving image portions with the same priority are selected, the portion selecting section sets with priority from the moving image portions with the same priority a moving image portion which is separated more evenly and farther from two points, one point on each side of the moving image portion among time showing a beginning of the moving image, time showing an end of the moving image or time showing the moving image portion already set as the playback portion, as the playback portion of the moving image of the digest playback target.

4. A moving image capturing method of a moving image capturing apparatus including a capturing section which captures a moving image; and a sensor which performs measurement to detect a state when moving, the moving image capturing method comprising:
operation judging which judges a type of state when moving based on a measured value of the sensor;
priority setting which sets a priority for a moving image portion corresponding to a period judged with the type of state in a moving image captured by the capturing section according to the type of state judged in the operation judging based on a predetermined standard; and
storing which stores the priority set in the priority setting corresponded with the moving image portion;
wherein the capturing section stops capturing of the moving image during a period in which a priority of a predetermined level or more is not set by the priority setting.

5. A non-transitory computer-readable storage medium having a program stored thereon for controlling a computer used in a moving image capturing apparatus including a capturing section which captures a moving image; and a sensor which performs measurement to detect a state when moving, wherein the program controls the computer to function as:
an operation judging section which judges a type of state when moving based on a measured value of the sensor;
a priority setting section which sets a priority for a moving image portion corresponding to a period judged with the type of state in a moving image captured by the capturing section according to the type of state judged by the operation judging section based on a predetermined standard; and
a storage section which stores the priority set by the priority setting section corresponded with the moving image portion;
wherein the capturing section stops capturing of the moving image during a period in which a priority of a predetermined level or more is not set by the priority setting section.

6. A digest playback setting method which sets a playback portion for digest playback of moving image data automatically set with a priority for each portion of a string of moving images, the digest playback setting method comprising:
portion selecting to select in order from a moving image portion set with a high priority;
selected time comparing which compares a total amount of time of a selected moving image portion and a range of a digest playback time set in advance each time the moving image portion is selected in the portion selecting; and
setting which sets a playback portion of a moving image of a digest playback target, wherein when it is judged in the selected time comparing that the total amount of time of the selected moving image portion exceeds the range of digest playback time, the moving image portion selected until one time before is set as the playback portion of the moving image of the digest playback target;
wherein when there are a plurality of moving image portions with a same priority and the total amount of time of the selected moving image portion exceeds the range of the digest playback time if all of the moving image portions with the same priority are selected, the portion selecting sets with priority from the moving image portions with the same priority a moving image portion which is separated more evenly and farther from two points, one point on each side of the moving image portion among time showing a beginning of the moving image, time showing an end of the moving image or time showing the moving image portion already set as the playback portion, as the playback portion of the moving image of the digest playback target.

7. A non-transitory computer-readable storage medium having a program stored thereon for controlling a computer to function as a digest playback setting section which sets a playback portion for digest playback of moving image data automatically set with a priority for each portion of a string of moving images, the digest playback setting section comprising:
a portion selecting section to select in order from a moving image portion set with a high priority;
a selected time comparing section which compares a total amount of time of a selected moving image portion and a range of a digest playback time set in advance each time the moving image portion is selected by the portion selecting section; and a setting section which sets a playback portion of a moving image of a digest playback target, wherein when the selected time comparing section judges that the total amount of time of the selected moving image portion exceeds the range of digest playback time, the moving image portion selected until one time before is set as the playback portion of the moving image of the digest playback target;

wherein when there are a plurality of moving image portions with a same priority and the total amount of time of the selected moving image portion exceeds the range of the digest playback time if all of the moving image portions with the same priority are selected, the portion selecting section sets with priority from the moving image portions with the same priority a moving image portion which is separated more evenly and farther from two points, one point on each side of the moving image portion among time showing a beginning of the moving image, time showing an end of the moving image or time showing the moving image portion already set as the playback portion, as the playback portion of the moving image of the digest playback target.

8. A moving image capturing method of a moving image capturing apparatus including a capturing section which captures a moving image; and a sensor which performs measurement to detect a state when moving, the moving image capturing method comprising:

operation judging which judges a type of state when moving based on a measured value of the sensor;

priority setting which sets a priority for a moving image portion corresponding to a period judged with the type of state in a moving image captured by the capturing section according to the type of state judged in the operation judging based on a predetermined standard; and storing which stores the priority set in the priority setting corresponded with the moving image portion;

wherein when a predetermined amount of time passes from a timing that a certain priority is set or a higher priority is set over the certain priority, a period which is set with the certain priority ends.

9. A non-transitory computer-readable storage medium having a program stored thereon for controlling a computer used in a moving image capturing apparatus including a capturing section which captures a moving image; and a sensor which performs measurement to detect a state when moving, wherein the program controls the computer to function as:

an operation judging section which judges a type of state when moving based on a measured value of the sensor;

a priority setting section which sets a priority for a moving image portion corresponding to a period judged with the type of state in a moving image captured by the capturing section according to the type of state judged by the operation judging section based on a predetermined standard; and a storage section which stores the priority set by the priority setting section corresponded with the moving image portion;

wherein when a predetermined amount of time passes from a timing that a certain priority is set or a higher priority is set over the certain priority, the priority setting section ends a period which is set with the certain priority.

* * * * *